United States Patent Office 3,435,709
Patented Apr. 1, 1969

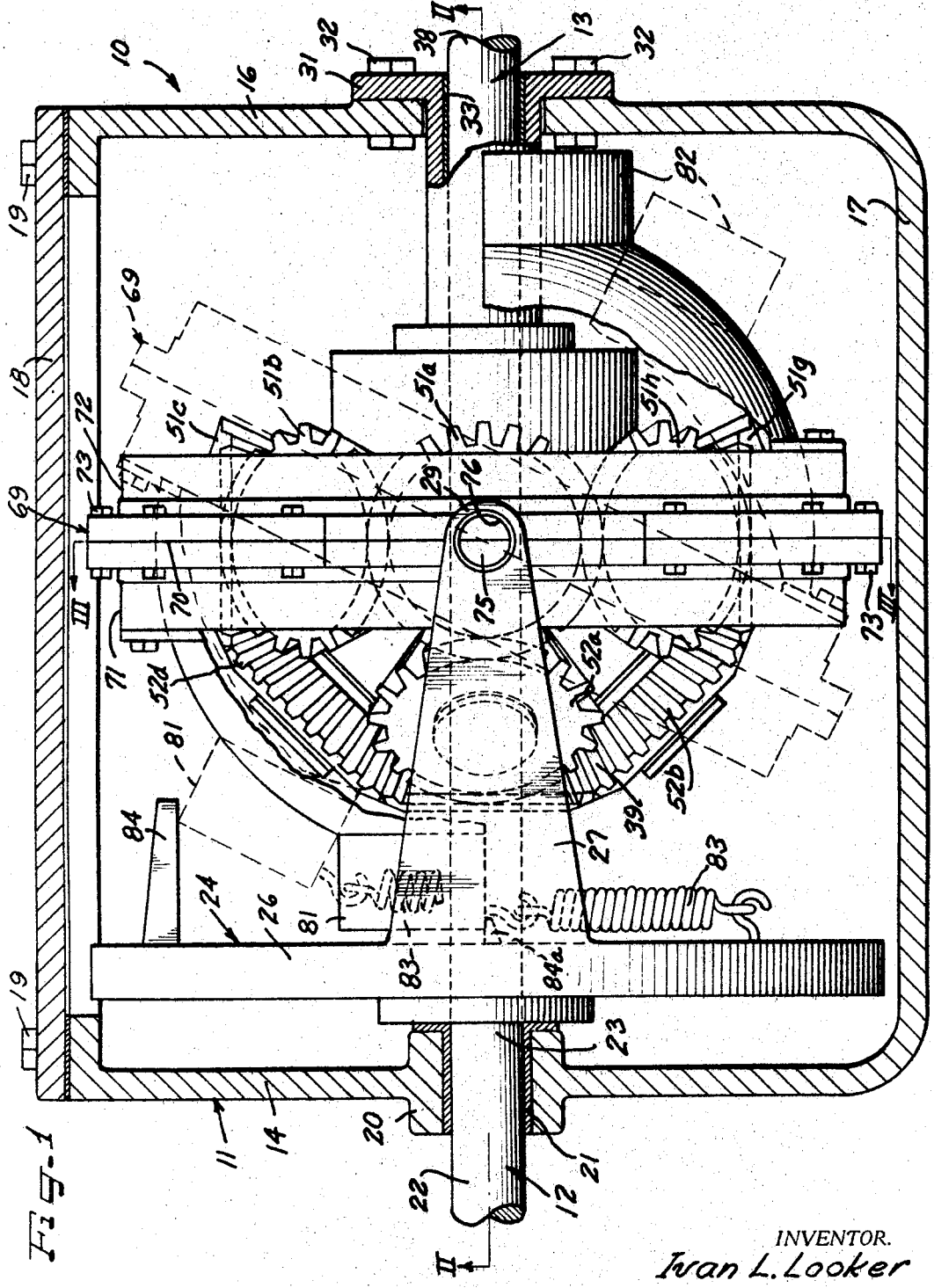

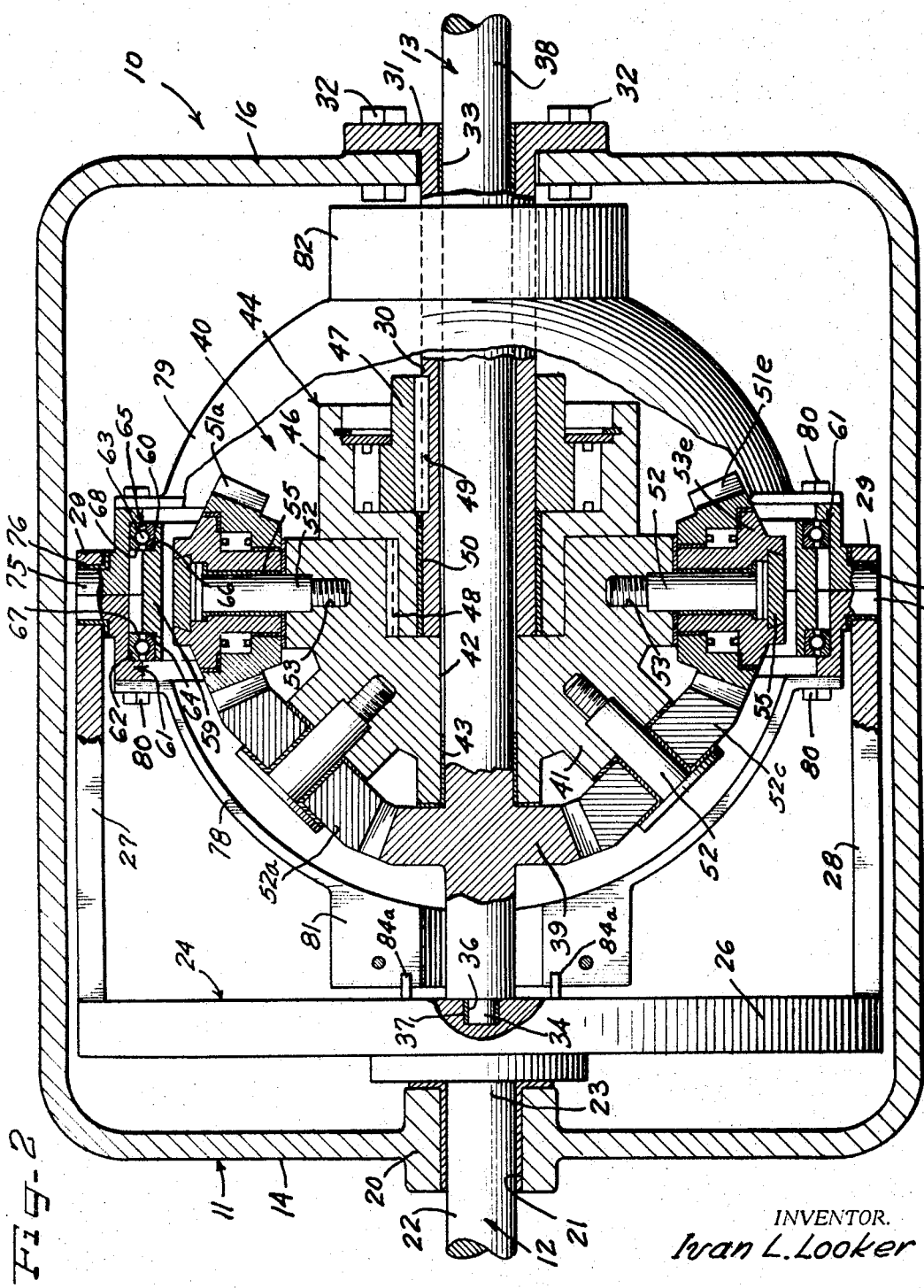

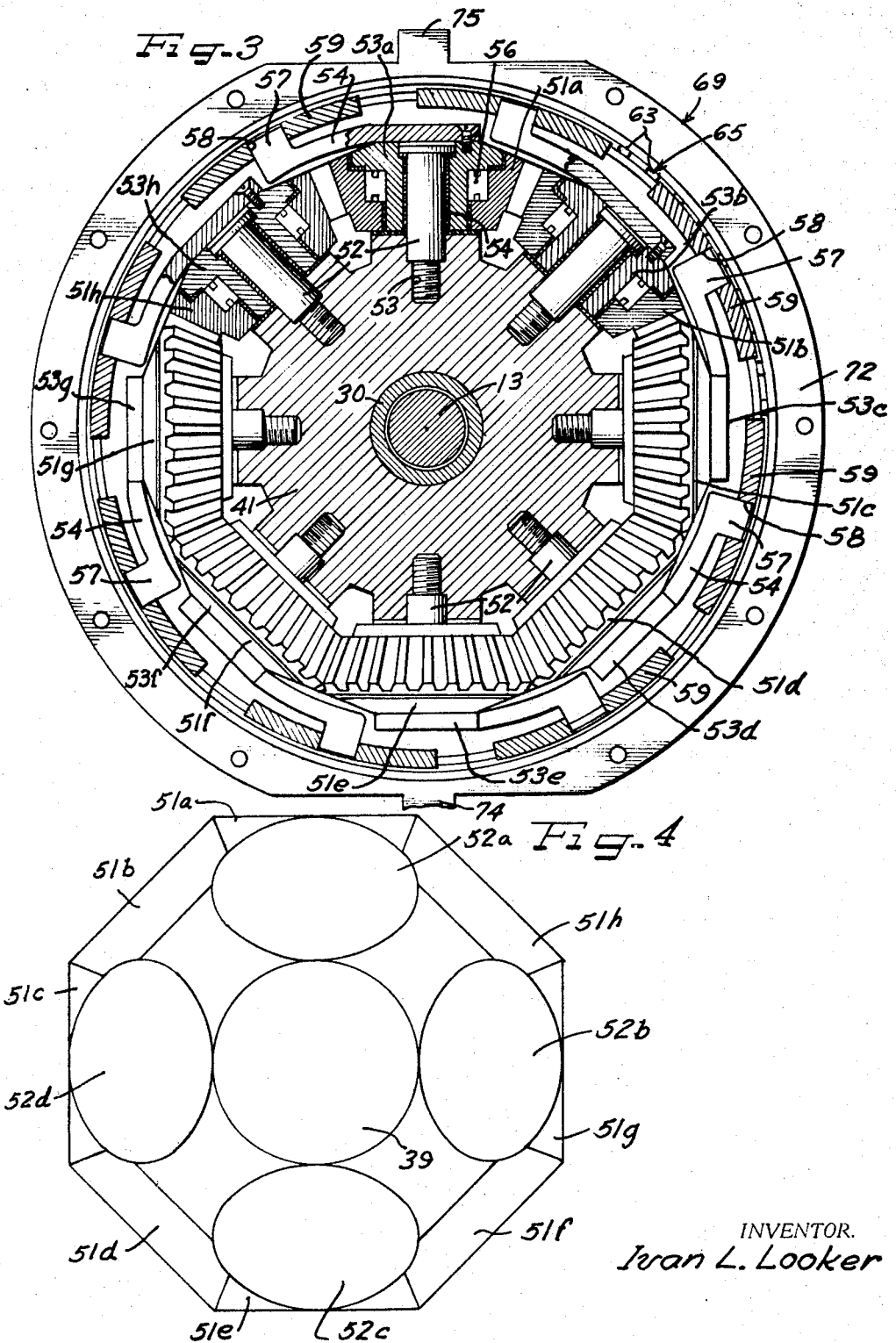

3,435,709
VARIABLE SPEED TRANSMISSION
Ivan L. Looker, 560 E. Mulberry St., Watseka, Ill. 60970
Filed Apr. 19, 1967, Ser. No. 631,984
Int. Cl. F16h *3/74*
U.S. Cl. 74—752          15 Claims

ABSTRACT OF THE DISCLOSURE

An infinitely variable-speed transmission including an input and an output shaft, a driven gear on the output shaft, a rotatable gear carrier journalling a plurality of pinion gears and idler gears in meshing relation with the driven gear, one-way clutches mounted respectively on said pinion gears, a wobble plate or cam ring mounted on the input shaft for rotation both with and on the same axis as the input shaft and also mounted for rotation relative to the input shaft about an axis perpendicular to the axis of rotation of the input shaft and to the central axis of the wobble plate for operating the one-way clutches as the input shaft rotates to a greater or lesser degree depending upon the angle between the axis of rotation of the input shaft and the central axis of the wobble plate, a stationary housing journalling the input and output shafts and an over-running clutch interconnecting the gear carrier and the housing.

Background of the invention

This invention relates generally to the art of variable-speed transmissions and more particularly to a mechanically operated transmission capable of varying the ratio of input and output shaft speeds and torques from infinity to 1:1 or less, while always maintaining all of the gears of the transmission continuously in mesh, thereby avoiding the problems inherent in shifting rotating gears into and out of meshing engagement.

The prior art includes transmissions of this general type. See, for example, Looker U.S. Patent No. 2,959,062, which is expositive of a mechanically operated infinitely variable-speed transmission wherein all of the gears are continuously intermeshed.

The present invention, however, substantially improves upon the operation and useful applications of the transmission disclosed in Looker 2,959,062 in several important respects. For example, the present invention includes provision for automatic changes in the ratio of input and output shaft speeds and torques as a function of the speed of the input shaft. Further, the present invention affords greater smoothness in operation and is capable of serving a longer and more useful operating life. By virtue of the physical arangement of the output shaft vis-a-vis the transmission housing, the present invention is capable of being connected more easily to a driven member. By virtue of the use of idler gears gear ratios are obtainable enabling this transmission to attain a 1:1 ratio and a direct drive.

Summary of the invention

An embodiment of a variable speed transmission of the present invention may be briefly and generally summarized as comprising rotatable driving and driven members, a driven gear on the driven member, a compound gear assembly comprising a plurality of gears in constant intermeshing relation with each other and with the driven gear, one-way clutch means operatively connected to certain of the gears, adjustably positionable wobble plate or cam means mounted on the driving member for joint rotation therewith and movable for movement relative thereto between first and second positions and operative depending upon the position thereof for conveying rotary motion of the driving member to reciprocable translatory motion, means operatively engaging the wobble plate means with the one-way clutch means whereby said wobble plate means is positionable to drive said one-way clutch means by said reciprocable translatory motion a distance per revolution of said driving member which varies in magnitude according to the position of said wobble plate means relative to the driving member between said first and said second positions for varying the speed and torque of the output shaft relative to the speed and torque of the input shaft, and means for automatically positioning the wobble plate relative to the driving member as a function of the speed of the driving member.

The present invention also features a circumferentially continuous circular pattern of pinion gears which are driven directly by the one-way clutches and a series of intermediate or idler gears between the pinion gears and the driven gear. This arrangement not only improves the operating characteristics but also serves to increase the useful life of the transmission.

It is, therefore, an object of the present invention to provide an infinitely variable-speed mechanical transmission with means for automatically varying the speed ratio as a function of input shaft speed.

Another object is to provide a smoother operating transmission of the type described.

Another object is to provide a compound gear assembly for the transmission having pinion gears driven by one-way clutches and idler gears between the pinion gears and the driven gear on the output shaft in optimum ratios relative to one another for improving operating characteristics and for increasing the useful life of the transmission.

Another object of the present invention is to confer upon a transmission of the general type described the ability to be more easily coupled to mechanisms driven by the transmission.

Many other features, advantages and additional objects of the present invention will become manifest to those versed in the art upon making reference to the detailed description which follows and the accompanying sheets of drawings in which preferred structural embodiments incorporating the principles of the present invention are shown by way of illustrative example only.

Brief description of the drawings

FIGURE 1 is a side sectional view of an infinitely variable-speed transmission constructed in accordance with the principles of the present invention in which the compound gear assembly and other parts are shown in elevation.

FIGURE 2 is a horizontal sectional view taken substantially along lines II—II of FIGURE 1 with portions broken away to illustrate the relative disposition of parts.

FIGURE 3 is a vertical sectional view taken along lines III—III of FIGURE 1.

FIGURE 4 is a somewhat schematic showing of the gear arrangement of the present invention when the gears are viewed from the left hand toward the right hand side of FIGURE 1.

Description of the preferred embodiment

Referring to the drawings, an embodiment of an infinitely variable-speed mechanical transmission constructed in accordance with the principles of the present invention is indicated generally at reference numeral 10 and comprises a transmission housing 11, an input or driving shaft 12 and an output or driven shaft 13. The shafts 12 and 13 are journalled for rotation on the housing 11 on aligned axes, shaft 12 being supported on an end wall 14 of the housing 11 and shaft 13 being supported on an end wall 16. The bottom of the housing is closed by a wall 17 and a cover plate 18 may be removably secured to the top of the housing 11 by means of suitable fasteners as indicated at 19.

The input shaft 12 extends through the housing wall 14 and is journalled on a bearing block 20 and a sleeve bearing 21. An outer end 22 of the input shaft may be adapted for connection to a prime mover or any other suitable driving mechanism and an inner end 23 which extends into the interior of the housing 11 is connected in fixed assembly for corotation to a bifurcated member 24 which comprises a circular disc 26 extending radially with respect to the axis of rotation of the input shaft 12 and a pair of spaced parallel legs 27 and 28 extending axially from the disc 26. As illustrated, a distal end 29 of each of the legs 27 and 28 extends to about the longitudinal midpoint of the transmission housing 11.

The output shaft 13 extends substantially across the interior of the housing 11 and is journalled on a tubular bushing 30 which comprises a radial plate 31 bolted as at 32 to the outer side of the housing wall 16 and extending into the housing 11 to about or slightly beyond the midpoint thereof. A sleeve bearing 33 is housed in the bushing 30 and a reduced diameter nose 34 of the shaft 13 is journalled in a sleeve bearing 36 carried in a central aperture 37 formed in the radial plate or circular disc 26 of the bifurcated member 24.

It is noted that an outer end 38 extends outwardly beyond the end wall 16 of the housing 11 and the bearings which journal the shaft and can be easily adapted for connection to any suitable mechanism to be driven without the necessity of making connections to the driven shaft interiorly of the housing 11 or inboard of the bearings which journal the shaft.

A driven gear 39 is formed integrally with the output shaft 13 and it is the rotation of this gear which directly causes the output shaft 13 to rotate. The driven gear 39 is not connected directly to the input shaft 12 but is instead indirectly connected thereto through a compound gear assembly indicated generally at reference numeral 40.

The assembly 40 comprises a gear carrier 41 centrally apertured as at 42 to receive the output shaft 13 and journalled for rotation relative to the output shaft by means of a sleeve bearing 43. The gear carrier 41 is connected to the housing 11 through the bushing 30 and overrunning clutch 44 more particularly characterized as comprising a pair of relatively rotatable members 46 and 47. The carrier 41 is keyed for joint rotation to rotatable member 46 through a key indicated at 48, and the rotatable member 47 is locked to the stationary bushing 30 through a key indicated at 49. A sleeve bearing 50 is interposed between the rotatable member 46 and the bushing 30.

Two series of gears are carried by the gear carrier 41, the first of which comprises a plurality of ring or pinion gears arranged in a circular pattern around the axis of rotation of the output shaft 13 and the second of which comprises idler gears interconnecting the pinion gears and the driven gear 39 in meshing relation.

In the illustrated embodiment there are a total of eight (8) pinion gears indicated respectively at reference characters 51a–51h. Each of the pinion gears is mounted on a gear shaft 52 threaded into a complementarily threaded bore 53 formed in the gear carrier 41 and journalled on a sleeve bearing 55 surrounding the shaft 52. The axes of rotation of the pinion gears 51a–51h extend perpendicularly to the axis of rotation of the output shaft 13 with which they intersect at a common point. All of the pinion gears 51a–51h have the same pitch diameter, are bevel gears and are constantly in meshing engagement whereby the rotation of one causes the rotation of all of the pinion gears.

In the illustrated embodiment there are a total of four (4) idler gears indicated respectively at reference characters 52a–52d. The idler gears have the same pitch diameter as do the pinion gears 51a–51h and the driven gear 39. In addition the idler gears are also of the bevel type and each is in constant intermeshing relation with the driven gear 39 and one of the pinion gears 51a–51h. It may be said, therefore, that in all critical respects the actual configurations of the driven gear 39, of the pinion gears 51a–51h and of the idler gears 52a–52d are identical.

The axes of rotation of driven gear 39, pinion gears 51a and 51e and idler gears 52a and 52c reside in a common plane. The axis of rotation of the idler gear 52a bisects the angle formed by the axes of rotation of the pinion gear 51a and the driven gear 39, and the axis of rotation of the idler gear 52c bisects the angle between the axes of rotation of the driven gear 39 and the pinion gear 51e. The same angular bisecting relationship exists between idler gears 52b and 52d and pinion gears 51g and 51c and the driven gear 39.

A plurality of one-way clutches indicated respectively at 53a–53h are reciprocably rotatably mounted on the pinion gears 51a–51h. Each of the one-way clutches 53a–53h comprises a generally radially extending actuating arm 54 and is drivingly interconnected to its pinion gear in one direction of rotation by a series of circumferentially spaced sprags 56. Since one-way clutch mechanisms are old in the art and since the operability of the present invention does not depend upon one particular type of one-way clutch further details of clutches 53a–53h need not be included herein.

At the end of each of the actuating arms 54 is an outturned stud 57 which serves as a cam follower in rotatably oscillating the actuator arm 54 in opposite directions. Rotation of an actuating arm 54 in one direction serves to drive its respective pinion gear in that direction, whereby movement of the actuating arm in an opposite direction has no effect on its corresponding pinion gear. Since the one-way clutches 53a–53h operate in the nature of overrunning clutches, the pinion gears 51a–51h may be referred to as combination overrunning clutch gears.

Each of the actuating arm studs 57 is received in a complemental bore 58 formed in a slide member or follower plate 59. The slide members, in turn, are mounted in circumferentially spaced relation along inner races 60 of a bearing 65 which comprises a portion of an annularly shaped wobble plate or cam member 61 which extends around the gear carrier 41 in surrounding relation.

An outer race 62 of the bearing 65 is spaced from the inner race 60 by means of a plurality of bearing balls or the like as at 63 (only certain of which are illustrated in FIG. 3 to clarify the figure) whereby the inner and outer races are rotatable with respect to each other about the central axis of the cam member 61. Each of the slide members 59 is undercut along the opposite edges thereof as at 64 and 66 to provide shoulder surfaces for guiding movement of the slide members 59 within a guide-way formed between cam surfaces comprising a pair of facing inner walls 67 and 68 of the cam member 61.

The outer race 62 is connected in fixed assembly to a cam mounting bracket 69 which is radially split as at 70 into two half portions 71 and 72 that are connected together by means of a plurality of fasteners as indicated at 73. The cam mounting bracket 69 has a central axis which coincides with the central axis of the cam member 61 and is rotatably mounted on the two legs 27 and 28 of the bifurcated member 24 by means of a pair of shaft stubs 74 and 75 carried respectively in sleeve bearings 76 and 77 mounted on the legs 27 and 28 near the distal ends 29 thereof.

The underlying operational concept of the present invention involves the utilization of the oscillating one-way clutches to drive the output shaft. The actuating arms of the one-way clutches are oscillated by means of the wobble plate or cam member which translates rotary motion of the input shaft into reciprocating translatory motion of the actuating arms of the one-way clutches. The angle of inclination of the wobble plate or cam member determines the speed of the output shaft relative to the input shaft since the magnitude of the translatory motion of the actuating arms for each revolution of the input shaft varies in accordance with the angle between the cam member and the axis of rotation of the input shaft.

For example, in the operation of the transmission 10, when the input shaft 12 rotates, the bifurcated member 24 and the cam mounting bracket 69 are rotated at the same speed. If the central axis of the cam mounting bracket 69 and the cam member 61 is aligned and coincides with the axes of the input and output shafts 12 and 13, respectively, as shown in the full lines of the cam mounting bracket 69 in FIGURE 1, the output shaft 13 will not rotate. This is because in such position of the cam mounting bracket 69 the actuator arms 54 of all of the one-way clutches 53a–53h extend circumferentially around the cam member 61. Further the cam member 61 does not wobble about the aligned axes of the input and output shafts 12 and 13 as the input shaft 12 is rotated.

When the cam member and cam mounting bracket 61 and 69 are inclined with respect to the axes of shafts 12 and 13, however, as shown in the dashed lines in FIGURE 1, the cam member 61 has the effect of wobbling back and forth. By this is meant that in the inclined position of the cam member, as the input shaft 12 rotates, that portion of the cam mounting bracket 69 which is most closely spaced to the housing wall 16 is disposed first on one side and then on an opposite side of the axes of the input and output shafts 12 and 13.

As the cam member 61 wobbles, the cam followers 57 of the one-way clutch actuating arms 54 are oscillated back and forth for each revolution of the input shaft 12, the magnitude of the oscillating movement depending upon the magnitude of the angle between the central axis of the cam member 61 and the axes of the input and output shafts 12 and 13. In other words, the greater the angle of inclination of the cam member 61, the greater the oscillating movement of the actuating arms 54 for each revolution of the input shaft 12.

As the actuating arms 54 are oscillated, the pinion gears 51a–51h are driven thereby. Of course each of the pinion gears is only positively driven by its respective one-way clutch as the actuating arm moves in one of two opposite directions. At least one of the actuating arms 54 is always moving in a direction to drive its corresponding pinion gear. Since all of the pinion gears 51a–51h are constantly intermeshed, the speed of all of the pinion gears increases as the angle of inclination of the cam member 61 increases. The pinion gears 51a–51h turn the idler gears 52a–52d, which in turn rotate the driven gear 39 and the output shaft 13. Of course the gear carrier 41 does not rotate at this time since the overriding clutch 44 locks the gear 41 to the transmission housing 11 through the bushing 30.

If the cam member 61 is inclined a given angle the speed of the output shaft 13 will equal the speed of the input shaft 12. As this relationship between the speeds of the shafts obtains, the overrunning clutch 44 unlocks the gear carrier 41 from the transmission housing 11. As this occurs the force required to rotate the entire compound gear assembly 40 along with the input shaft 12 is less than the force required to turn all of the pinion gears 51a–51h and idler gears 52a–52d. As a result, the input shaft 12, the bifurcated member 24, the cam member 61, the cam mounting bracket 69, the compound gear assembly 40 and the output shaft 13 all rotate as a single unit, effectively providing direct drive from the input shaft 12 to the output shaft 13.

In order to vary the angle of inclination of the cam member 61 as a function of the speed of the input shaft 12, a pair of fragmentally spherically formed mounting plates 78 and 79 are mounted on the cam mounting bracket 69 by suitable fasteners as indicated at reference numeral 80. Enlarged portions 81 and 82 are formed integrally on the mounting plates 78 and 79 to provide a concentrated mass responsive to centrifugal force as the input shaft 12 rotates. A pair of heavy tension springs as indicated at 83 are each connected at one end to the bifurcated member 24 and at the other end to the mass 81 for biasing the cam mounting bracket 69 to the position thereof shown in the full lines in FIGURE 1, at which position the central axes of the cam member 61 and the cam mounting bracket 69 coincide with the axes of the input and output shafts 12 and 13.

In this position the weighted portion 82 of the plate 79 is brought into abutting engagement with a bracket 84a to provide a stop for the cam moutning bracket. Another stop 84 projects from the disc 26 of the bifurcated member 24 to limit the angle of inclination of the cam mounting bracket 69.

It will thus be appreciated that as the speed of the input shaft 12 increases, the weighted portions 81 and 82 are automatically shifted by centrifugal force to increase the angle of inclination of the cam member 61 which correspondingly increases the speed of the output shaft 13. As the speed of the output shaft 13 attains the speed of the input shaft 12 the overrunning clutch 44 releases the gear carrier 41 from the transmission housing 11, and the output shaft 13 is then, in effect, directly driven by the input shaft 12.

Since all of the gears of the transmission constantly intermesh with one another the output shaft 13 is driven smoothly through the entire range of speed ratios. Although the embodiment illustrated comprises a total of eight pinion gears 51a–51h and four idler gears 53a–53d, additional pinion and idler gears may be provided.

The intermeshing relation of the compound gear assembly 40 may be provided when the number of pinion gears equal $2^n$, where $n$ is a whole number greater than 2. The number of idler gears may be increased also, and an idler gear may be provided for circumferentially alternate pinion gears. This arrangement is possible as long as all of the gears, including the driven gear 39, are of substantially the same pitch diameter.

Although minor modifications might be suggested by those versed in the art, it should be understood that I wish to embody within the scope of the patent warranted hereon all such modifications as reasonably come within the scope of my contribution to the art.

I claim as my invention:

1. An infinitely variable-speed mechanically operated transmission comprising, an input and an output shaft, bearing means mounting said shafts for relative rotation on aligned axes, a driven gear mounted for corotation on said output shaft, a compound gear assembly comprising means providing a gear carrier, a plurality of circumferentially spaced pinion gears disposed in a circular pattern around an axis aligned with the axis of rotation of said output shoft and mounted on said gear carrier for rotation about a plurality of corresponding axes extending transversely of and intersecting the axis of said output shaft, and a plurality of idler gears rotatably mounted on said gear carrier each in constant operative intermeshing relation with one of said pinion gears and said driven gear, a plurality of one-way clutch means mounted on said pinion gears each having an actuating arm movable in opposite directions to turn said pinion gears, means for driving said actuating arms in said opposite directions comprising an annular cam member connected to said intput shaft for corotation therewith about the axis of rotation thereof and for relative pivotal movement therewith about an axis transversely of and intersecting the axis of rotation thereof, means on said cam member and said actuator arms for maintaining an operative engagement therebetween, and means for selectively pivoting said cam member relative to said input shaft for varying the driving relation between said cam member and said actuator arms in said opposite directions to vary the speed of said output shaft relative to said input shaft.

2. The variable speed transmission as defined in claim 1 and including
stationary means for journalling said gear carrier for rotation about an axis aligned with the axis of rotation of said output shaft, and
means releasably locking said gear carrier to said stationary means against relative rotation therebetween.

3. The variable speed transmission as defined in claim 2 wherein said locking means comprises an overrunning clutch having a pair of relatively rotatable members fixedly secured to said gear carrier and said stationary means respectively.

4. The variable speed transmission as defined in claim 1 wherein said driven gear, said pinion gears and said idler gears comprise bevel gears.

5. The variable speed transmission as defined in claim 1 wherein said pinion gears are in intermeshing relation with one another for turning together.

6. The variable speed transmission as defined in claim 5 wherein the number of ring gears equal $2^n$ where $n$ is greater than 2.

7. The variable speed transmission as defined in claim 1 wherein said idler gears directly interconnect said driven gear and circumferentially alternate ones of said pinion gears in said pattern.

8. The variable speed transmission as defined in claim 1 wherein said idler gears are all disposed on one axial side of said pattern of pinion gears.

9. A mechanical transmission comprising,
a casing,
coaxially aligned drive and driven shafts journalled within said casing,
a cam ring,
a stirrup connected to and extending from a free end of said drive shaft and pivotally carrying said ring from two diametrically opposed points on the ring,
a plurality of pinion gears carried on said casing with their axes lying in a plane normal to the axes of said shafts,
a one-way clutch associated with each of said pinion gears and having its output end drivingly connected to said gears,
a lever arm connected to the input end of each of said clutches and extending radially outwardly from each of said pinion gears,
means slidably carrying the free ends of said lever arms within said ring at spaced points about said ring,
means tilting said ring relative to the axes of said shafts as a function of variances in drive shaft speed, and
gear means interconnecting said pinion gears with said driven shaft.

10. A mechanical transmission as defined in claim 9 wherein said pinion gears are carried on a pinion gear block and said block is carried for rotatable movement on said casing and a one-way clutch is provided between said block and said casing which releases when a 1:1 drive from said drive to said driven shaft is achieved.

11. A mechanical transmission comprising,
coaxially aligned input and output shafts,
a compound gear train comprising
eight combination overruning clutch gears,
less than five idler gears and one driven gear,
wherein said eight combination overruning clutch gears are mounted in a circle so that each is constantly in mesh with the two immediately adjacent combination overruning clutch gears, and wherein each of said idler gears is constantly in mesh with only one of said combination overruning clutch gears and with said driven gear,
means comprising a wobble ring pivotally and drivingly mounted on said input shaft and having a reciprocally rotatably and selectively drivable connection with each of said combination overruning clutch gears, and
means for selectively adjusting the angle of wobble of said wobble ring with respect to said input shaft.

12. The mechanical transmission as defined in claim 11 wherein all of said gears of said compound gear train have the same number of gear teeth, said number being an even number divisible by the number four.

13. The mechanical transmission as defined in claim 11 and including
means for effectively locking said input shaft, said output shaft and said gear train for joint rotation as the speed of rotation of said output shaft approaches the speed of rotation of said input shaft.

14. The mechanical transmission as defined in claim 13 wherein said locking means comprises
a stationary member, and
an overrunning clutch interconnecting said gear train and said stationary member.

15. The mechanical transmission as defined in claim 11 wherein
said selectively adjusting means comprises means for automatically adjusting the angle of said wobble ring as a function of the speed of rotation of said input shaft.

References Cited

UNITED STATES PATENTS

| | | | |
|---|---|---|---|
| 2,959,062 | 11/1960 | Looker | 74—117 |
| 3,082,648 | 3/1963 | Toliver | 74—117 |

FOREIGN PATENTS

| | | |
|---|---|---|
| 571,778 | 2/1924 | France. |

FRED C. MATTERN, JR., *Primary Examiner.*

W. S. RATLIFF, JR., *Assistant Examiner.*

U.S. Cl. X.R.

74—117